(12) United States Patent
Moore et al.

(10) Patent No.: US 11,676,562 B1
(45) Date of Patent: Jun. 13, 2023

(54) SYNTHETIC REED WITH CANE PARTICLES

(71) Applicant: D'Addario & Company, Inc., Farmingdale, NY (US)

(72) Inventors: John E. Moore, North Hollywood, CA (US); Kevin C. Garren, Valencia, CA (US); Joseph Tartakovsky, Northridge, CA (US); Patrick Alvarado, North Hollywood, CA (US); Marco A. Cardiel, Lancaster, CA (US); Joseph Sumerak, Solon, OH (US)

(73) Assignee: D'Addario & Company, Inc., Farmingdale, NY (US)

( * ) Notice: Subject to any disclaimer, the term of this patent is extended or adjusted under 35 U.S.C. 154(b) by 205 days.

(21) Appl. No.: 17/148,675

(22) Filed: Jan. 14, 2021

Related U.S. Application Data (60) Provisional application No. 62/960,829, filed on Jan. 14, 2020.

(51) Int. Cl.
   *G10D 9/035* (2020.01)
   *B29C 70/52* (2006.01)
   (Continued)

(52) U.S. Cl.
   CPC .......... *G10D 9/035* (2020.02); *B29C 70/52* (2013.01); *B29K 2001/08* (2013.01); *B29K 2023/06* (2013.01); *B29L 2031/758* (2013.01)

(58) Field of Classification Search
   CPC .... G10D 9/035; B29C 70/52; B29K 2001/08; B29K 2023/06; B29L 2031/758
   See application file for complete search history.

(56) References Cited

U.S. PATENT DOCUMENTS

| 4,014,241 A | 3/1977 | Gamble |
| 4,337,683 A | 7/1982 | Backus |
(Continued)

FOREIGN PATENT DOCUMENTS

| CA | 2261473 A1 | 8/2000 | |
| DE | 2838830 B1 * | 6/1978 | ............. G10D 9/035 |
(Continued)

OTHER PUBLICATIONS

Gardiner, Ginger, "Thermoformable Composite Panels," published pre-Jan. 14, 2020.
(Continued)

*Primary Examiner* — Kimberly R Lockett
(74) *Attorney, Agent, or Firm* — Alix, Yale & Ristas, LLP (57) ABSTRACT

A synthetic reed for use with a woodwind instrument includes a synthetic resin matrix with randomly distributed suspended cane particles. Synthetic fibers, which may comprise one or more different material filaments, may also be impregnated within resin matrix. The cane particles can be present in a concentration of approximately 0.5-10% by volume and at least a majority of the cane particles in the resin matrix can be less than 100 micrometers. The matrix may be formed from two components including an epoxy resin component and a hardener component. The reed exhibits improved strength properties usually provided by synthetics with the warmer sonic properties associated with natural cane reeds and preferred by musicians.

20 Claims, 7 Drawing Sheets

(51) Int. Cl.
    *B29L 31/00*     (2006.01)
    *B29K 1/00*     (2006.01)

(56) References Cited

U.S. PATENT DOCUMENTS

| | | |
|---|---|---|
| 4,355,560 A | 10/1982 | Shaffer |
| 4,559,262 A | 12/1985 | Cogswell et al. |
| 5,542,331 A | 8/1996 | Hartmann et al. |
| 5,891,560 A | 4/1999 | Edwards et al. |
| 6,087,571 A | 7/2000 | Legere |
| 7,579,396 B2 | 8/2009 | Blanton et al. |
| 7,902,443 B2 | 3/2011 | Legere et al. |
| 9,409,356 B2 | 8/2016 | Karb et al. |
| 10,290,290 B2 | 5/2019 | Van Doren |
| 2009/0229760 A1 | 9/2009 | Hamlyn et al. |
| 2017/0263219 A1 | 9/2017 | Van Doren |

FOREIGN PATENT DOCUMENTS

| | | |
|---|---|---|
| EP | 1787790 A1 | 5/2007 |
| FR | 2646270 A3 | 10/1990 |
| JP | 2008197450 A | 8/2008 |
| JP | 2017134156 A | 8/2017 |
| JP | 6428140 B2 | 11/2018 |
| JP | 2019189758 A | 10/2019 |
| WO | 2016042259 A1 | 3/2016 |

OTHER PUBLICATIONS

Novo, P.J. et al., "Development of a New Pultrusion Equipment to Manufacture Thermoplastic Matrix Composite Profiles," ECCM15-15th European Conference on Composite Materials, Venice, Italy, Jun. 24-28, 2012.

"Tegris. Thermoplastic Composites," Milliken & Company, published pre-Jan. 14, 2020.

"Threaded Products Data Sheet," Fulcrum Composites, Inc., published pre-Jan. 14, 2020.

"Vehicle Armor and Personal Protection," Tegris, published pre-Jan. 14, 2020.

\* cited by examiner

Figure 8A – Reed A

Figure 8B – Reed B

Figure 8C – Reed C

SYNTHETIC REED WITH CANE PARTICLES

BACKGROUND

The disclosed embodiments relate to reeds for woodwind instruments, such as clarinets and saxophones, and in particular to a reed and/or resin composition for forming a synthetic reed that includes a polymeric matrix with cane particles and a synthetic reed formed therefrom.

A reed is a thin strip of material that vibrates to produce a sound on a musical instrument. Historically, woodwind instrument reeds were made from naturally occurring cane. Reeds vary in properties such as density, strength, stiffness and tensile modulus, and can be altered by varying the shape and thickness of portions of the reed product itself, especially the relatively thin vamp section toward the tip.

Recently, technical advancements have been made in forming woodwind instrument reeds from synthetic materials, such as polymer materials. It is commonly believed that natural cane reeds produce the most pleasing sound profiles with a drawback being that they are usually less durable than synthetic reeds. Conversely, synthetic reeds possess improved durability, commonly at the expense of sound quality. It has been challenging to design a synthetic reed with sound properties like those of cane reeds without sacrificing durability.

In more recent years, significant research has been undertaken and advancements have been made in designing a synthetic reed with increased strength and modulus that sounds more like a natural cane reed when played in a woodwind instrument. One technique is to include synthetic or natural fibers, many of which are elongated and/or stretched throughout, in the synthetic matrix from which the reed is formed. However, the prevailing view is that synthetic reeds, while more durable, still do not achieve similar acoustic properties when played. Synthetic reeds are viewed as not providing the "warmth" of natural reeds due to their more rigid makeup.

It would thus be useful to provide a synthetic reed and/or a material for forming a synthetic reed that more closely mimics the material properties of natural cane and reeds formed from cane, and thus, mimics the sound produced when used in a woodwind instrument.

SUMMARY

In one embodiment, a composition for a woodwind instrument reed includes a synthetic resin matrix substrate with cane particles randomly distributed and suspended within the synthetic matrix substrate.

In another embodiment, a synthetic reed for a woodwind instrument includes a synthetic matrix substrate with synthetic fibers and cane particles suspended within the synthetic matrix substrate. The synthetic fibers comprise at least two different filaments. The cane particles are randomly distributed within the resin matrix substrate at a concentration within a range of approximately 0.5% to 10% by volume.

The synthetic woodwind instrument reed or a precursor thereof may be formed by a process of providing synthetic fibers, a Part A component and a Part B component. The Part A component comprises an epoxy resin and the Part B component comprises a hardener with dispersed cane particles. The Part A component is combined with the Part B component to form a non-solid matrix that is thereafter combined with the synthetic fibers. Hardening of the non-solid matrix is initiated to provide a solid form with embedded synthetic fibers and cane particles dispersed therein. The solid form is formed into a shape of a woodwind instrument reed.

BRIEF DESCRIPTION OF THE DRAWING

Aspects of the preferred embodiment will be described in reference to the drawings, where like numerals reflect like elements throughout.

DISCLOSURE OF THE INVENTION

Among the benefits and improvements disclosed herein, other objects and advantages of the disclosed embodiments will become apparent from the following wherein like numerals represent like parts throughout the several figures. Detailed embodiments of a synthetic reed with cane particles for woodwind instruments are disclosed; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrase "in some embodiments" as used herein does not necessarily refer to the same embodiment(s), though it may. The phrases "in another embodiment" and "in some other embodiments" as used herein do not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

Figure 2:
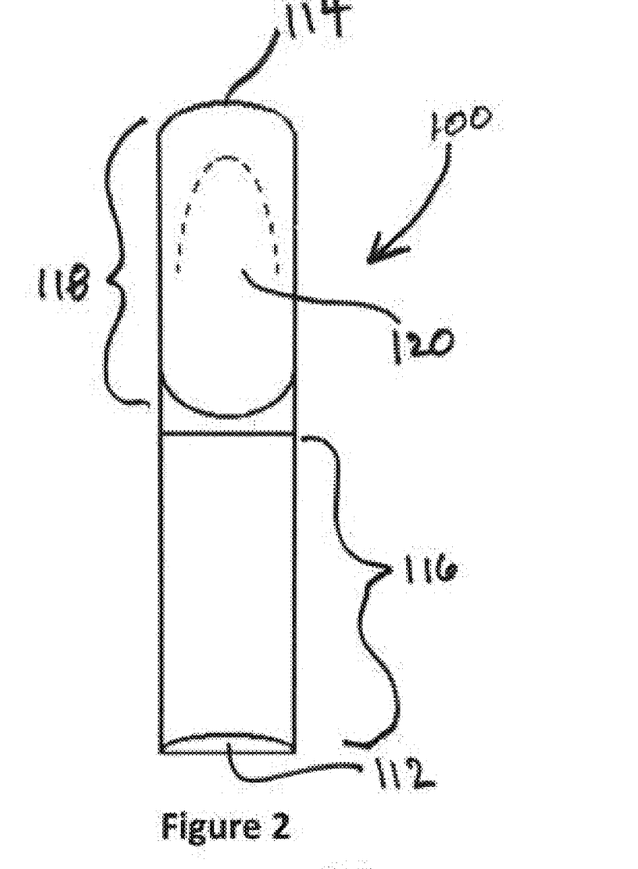
FIG. 2 is a top perspective view of an embodiment of the disclosed woodwind reed.
Figure 3:
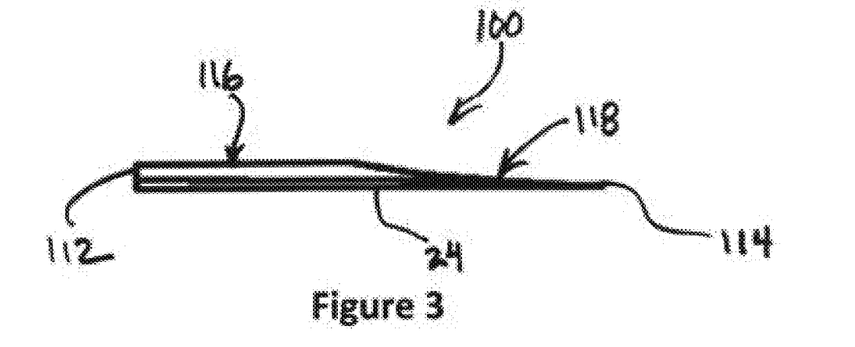
FIG. 3 is a side perspective view of the reed of FIG. 2.

Disclosed herein is a resin composition for forming a reed for a woodwind instrument, a reed formed of the resin composition, along with a method of making the resin composition and reed. Depictions of an exemplary woodwind reed 100 are shown in FIGS. 2 and 3. A relatively thicker stock portion 116 extends from a heel 112 and transitions to a thin vamp 118 that terminates at a tip 114. The portion of the vamp rear of the tip is known as the heart 120 and is understood as being critical to playability and sound quality.

Figure 1:
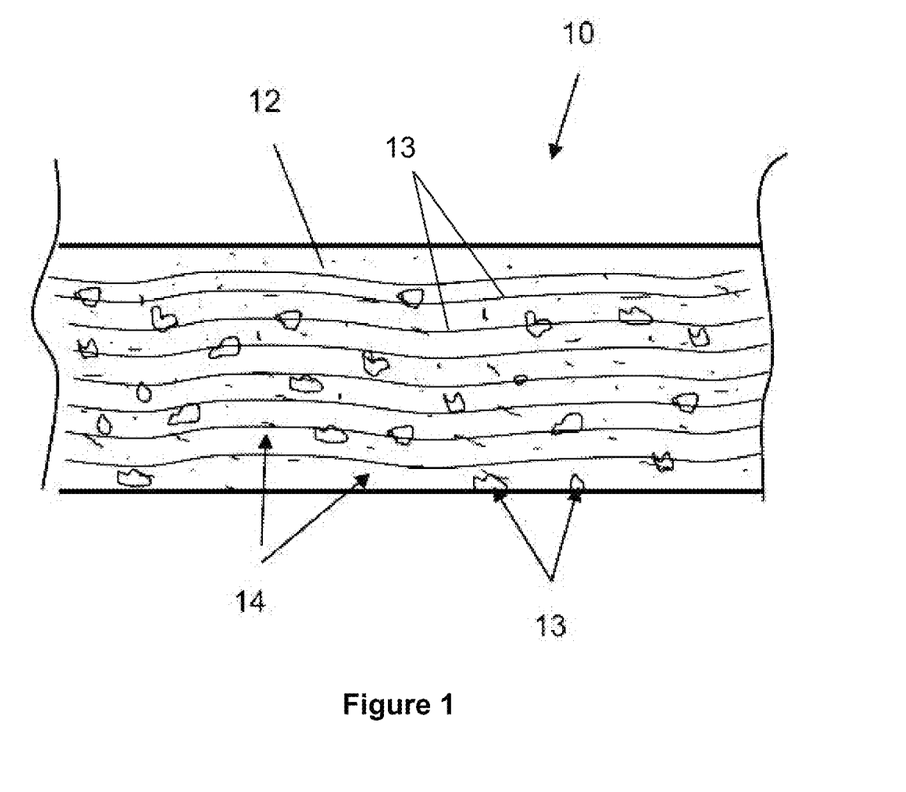
FIG. 1 shows an exemplary blank of a synthetic matrix composite with cane particle additives.

The disclosed embodiments yield a reed that combines improved durability and manufacturing efficiencies associated with synthetic reeds with playability characteristics that mimic natural cane reed when used in a woodwind instrument. FIG. 1 is a general representative depiction of the composition 10, including a hardened matrix substrate 12, reinforcing fibers 13 and randomly distributed cane particles 14.

The resin composition most generally includes a synthetic matrix substrate 12 with a moderate amount of cane particles 14. The cane particles 14 are preferably fine randomly distributed particles dispersed within the substrate 12 substantially homogenously. The matrix substrate 12 can be any known synthetic curable material with workability, durability, flexibility and elastic properties that are appropriate for use with synthetic reeds for woodwind instruments, including various thermoplastics and thermosetting polymers.

Examples of thermosets which may be employed as a matrix substrate include epoxy, silicone, polyurethane, polyester, vinyl ester, modified acrylic and phenolic resins.

Examples of thermoplastic resins which may be employed as a matrix include olefin resins, such as polyethylene and polypropylene; styrene resins, such as homopolymer, AS resin, HIPS; rubber-containing styrene resins, such as ABS resin, AES resin, ABSM resin, AAS resin; polyamide resin; polybutylene terephthalate resin; polyphenylene sulfide resin; polyether ether ketone resin; polyethylene terephthalate resin; polybutylene terephthalate resin; polyphenylene sulfide resin; polycarbonate resin; amorphous nylon; liquid crystal polymer; methacrylic resin; polyacetal resin; polyphenylene ether resin; acrylonitrile or styrene copolymer resin; biodegradable resins, such as PBS, PBSA, PCL, PLA and cellulose acetate, alone or in combination with one or more of the other thermoplastic resins.

Loose (and usually fine) cane particles are added to the matrix substrate in its pre-cured liquid state (in the case of a thermoset substrate) or a molten state (in the case of a thermoplastic substrate) and preferably mixed to a substantially homogenous suspension, to the extent possible. In some embodiments, one or more additives can be included to enhance stability of the suspension. In one preferred embodiment, the cane particles are formed as a byproduct during manufacture of cane reeds. Thus, the cane particles may take on a very fine powder- or dust-like form on the micron scale. For example, in some embodiments, at least a majority of the particles are sized as low as 10 microns or less. The particles are preferably irregular in shape, which promotes adhesion to the resin matrix.

In a preferred embodiment, the matrix resin is a thermosetting two-part epoxy. A first part includes an epoxy resin, and a second part includes an amine or anhydride hardener. An amount of fine cane particles is included in the matrix in an amount of approximately 1-5% by volume, which cane particles are randomly distributed. Another preferred embodiment includes fine randomly distributed cane particles in the matrix in an amount of approximately 1.5-3.5% by volume. Yet another embodiment includes randomly distributed cane particles in the matrix in an amount of approximately 2% by volume. Typically, each finished synthetic reed includes approximately 15-125 mg cane particles, more preferably approximately 25-75 mg, more preferably approximately 40-60 mg cane particles, and even more preferably approximately 50 mg cane particles. Other embodiments exist with a significantly higher concentration and/or mass of cane particles; however, these described preferred embodiments have shown to be optimal for imparting desired properties on the finished reed while maintaining manufacturing efficiencies.

In some embodiments, the matrix may be reinforced with one or more polymeric fibers, such as for example polypropylene, polyester, nylon, zylon, para- or meta-aramid, glass, polyphenylene sulfide (PPS), polyether ether ketone (PEEK), polyethylene terephthalate (PET), polyethylene naphthalate (PEN), and liquid crystal polymer (LCP). In a preferred embodiment, a quantity of fibers is impregnated within the two-component epoxy resin matrix containing cane particles and pulled through a pultrusion die at a continuous rate at an elevated temperature to cure the epoxy at the exit of the pultrusion die, thereby forming a continuous solid form or bar having a general cross-sectional shape of a woodwind reed. The continuous solid form material can thereafter be cut into individual blanks which are machined and sanded to form the inventive synthetic reeds. Usually, the cane particles originate in the hardener component of the matrix.

In a particularly preferred embodiment, the matrix is an epoxy resin reinforced with fibers comprising one or both of PEEK and Vectran™ LCP and cane particles dispersed throughout at 1.5-2.5% (usually approximately 2.0%). In one preferred embodiment, the epoxy resin is a BIS-F epoxy, however this is non-limiting to the inventive scope of the reed and reed precursor disclosed herein.

Figure 4:
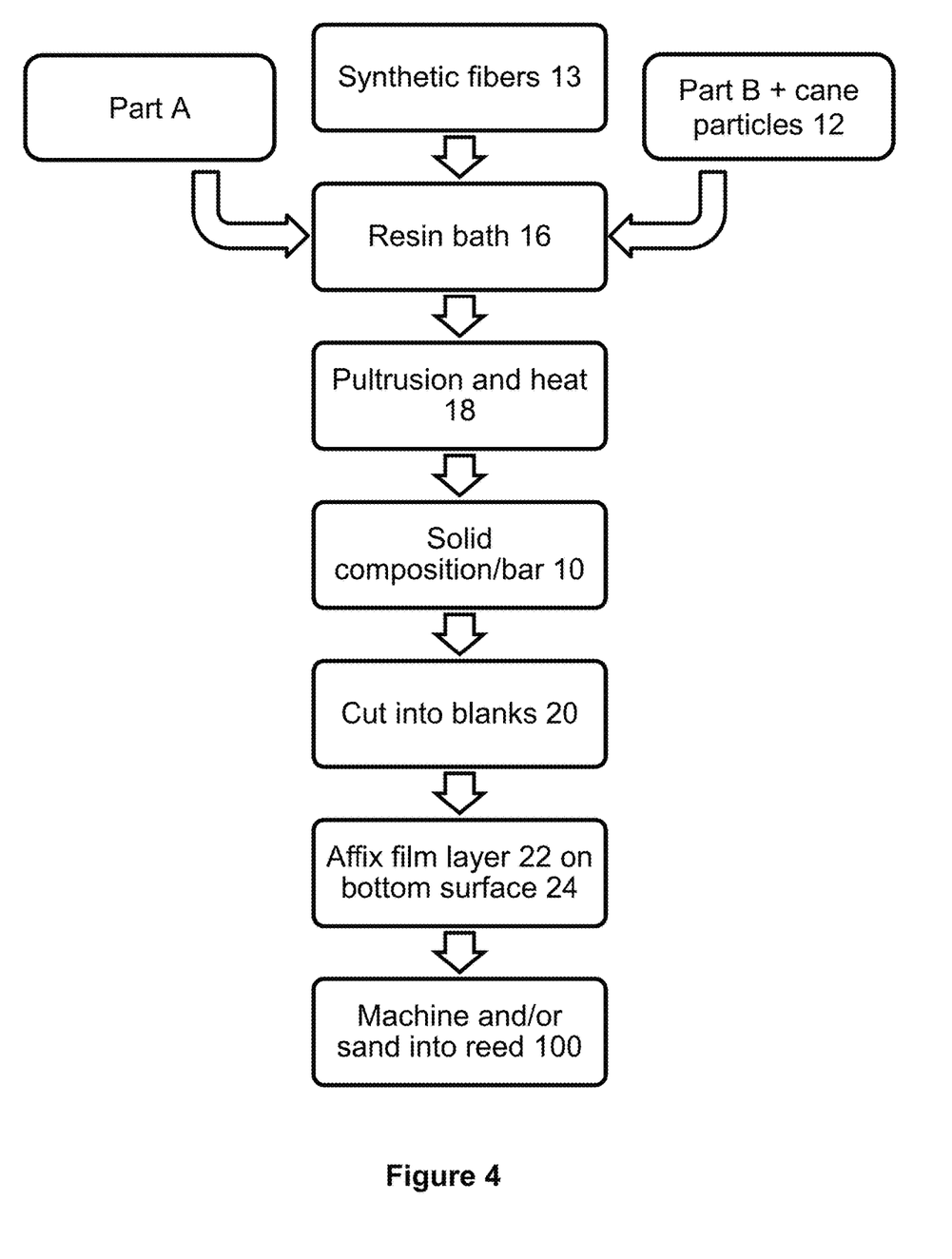
FIG. 4 is a flowchart depicting a preferred manufacturing process for the disclosed synthetic reed.

FIG. 4 is a flowchart depicting general steps of a preferred embodiment of a manufacturing process for the disclosed synthetic reed 100. Synthetic fibers 13 are combined with a resin bath 16 which may be formed from a Part A component and a Part B component. In a preferred embodiment, Part A comprises a curable epoxy resin and Part B comprises a hardener with loose cane particles 12 mixed randomly throughout. As shown in step 18, the fibers coated with resin are pulled through a pultrusion die under heated conditions to initiate curing of the matrix and yield a solid fiber-impregnated form or bar composition 10. The bar composition 10 is cut to predetermined sized blanks 20, typically with a saw, as it is pulled out from the pultrusion instrument. Optionally, a film layer 22, such as a tape or similar, is affixed to a bottom surface 24 of the blank, which serves to enhance structural integrity of the finished reed and reduce the likelihood of splitting. Each blank 20 undergoes mechanical processes, such as machining and sanding, to form the blank 20 into a form of a reed 100, like those shown generally in FIGS. 2 and 3.

Other techniques for forming the disclosed synthetic reeds or reed precursors with cane particles may be employed such as extrusion or injection molding.

Additional additives may be included in the matrix as generally accepted in the art for adjustment of physical properties, such as hollow glass bubbles to aid shrinkage control and improve surface smoothness. In fiber-reinforced composites, one or more adhesion promotors or coupling agents can be added as well. Non-limiting examples of such additives include reactive coupling agents and fumed silica.

When used in a woodwind reed instrument, the synthetic reed 100 with cane particles yields an average difference in decibel reading compared to natural cane of less than 1.5 dB over a variety of frequencies. Preferably, the synthetic reed 100 yields an average difference in decibel reading of between approximately 0.001 dB and 1.0 dB compared to natural cane, more preferably between approximately 0.01 dB and 0.75 dB compared to natural cane, more preferably between approximately 0.05 dB and 0.5 dB compared to natural cane, more preferably between 0.05 dB and 0.25 dB compared to natural cane, more preferably between approximately 0.07 dB and 0.25 dB compared to natural cane, more preferably between approximately 0.07 dB and 0.15 dB compared to natural cane, and even more preferably between approximately 0.07 dB and 0.15 dB compared to natural cane. In a particularly preferred embodiment, the synthetic reed with cane particles yields an average difference in decibel reading of between approximately 0.10 dB compared to natural cane.

EXAMPLES

Comprehensive sonic studies and analyses were performed to compare properties of a natural cane reed (Reed A), a synthetic reed with cane particles according to the disclosure (Reed B) and a commercially available synthetic reed without cane particles (Reed C). Spectral data for the analyses is shown in FIGS. 5-8B. The reeds that were analyzed pursuant to these Example are as follows:

Reed A: Select Jazz tenor saxophone reed (*Arundo Donax*) by D'Addario & Company, Inc.

Reed B: inventive synthetic reed with cane particles for tenor saxophone. The particular Reed B tested was formed from a two-part BIS-F epoxy resin matrix impregnated with synthetic fibers comprising PEEK and including cane particles (*Arundo donax*) randomly and substantially uniformly distributed within the matrix. Cane particles were present in the reed in an amount of approximately 2.0% by volume (approximately 50 mg cane particles).

Reed C: tenor saxophone reed by Legere Reeds LTD.

Testing parameters used in the Examples to collect the data shown in FIGS. 5-8B are as follows:

A major scale was played on tenor saxophone using each of Reed A, Reed B and Reed C. The scales were played by the same player on the same instrument under identical conditions and controlled using metronomes for aligning the timing of the recordings.

Recordings were saved as WAV Audio File Format files and edited to align start times and duration.

Resulting files were analyzed using programs with spectral analysis capabilities, including Audiotonic (for PC) and Audacity (for Mac), and a proprietary audio analysis tool provided by Blue2Digital: https://blue2digital.com/apps/compare-audios.html.

Example 1

Figure 5:
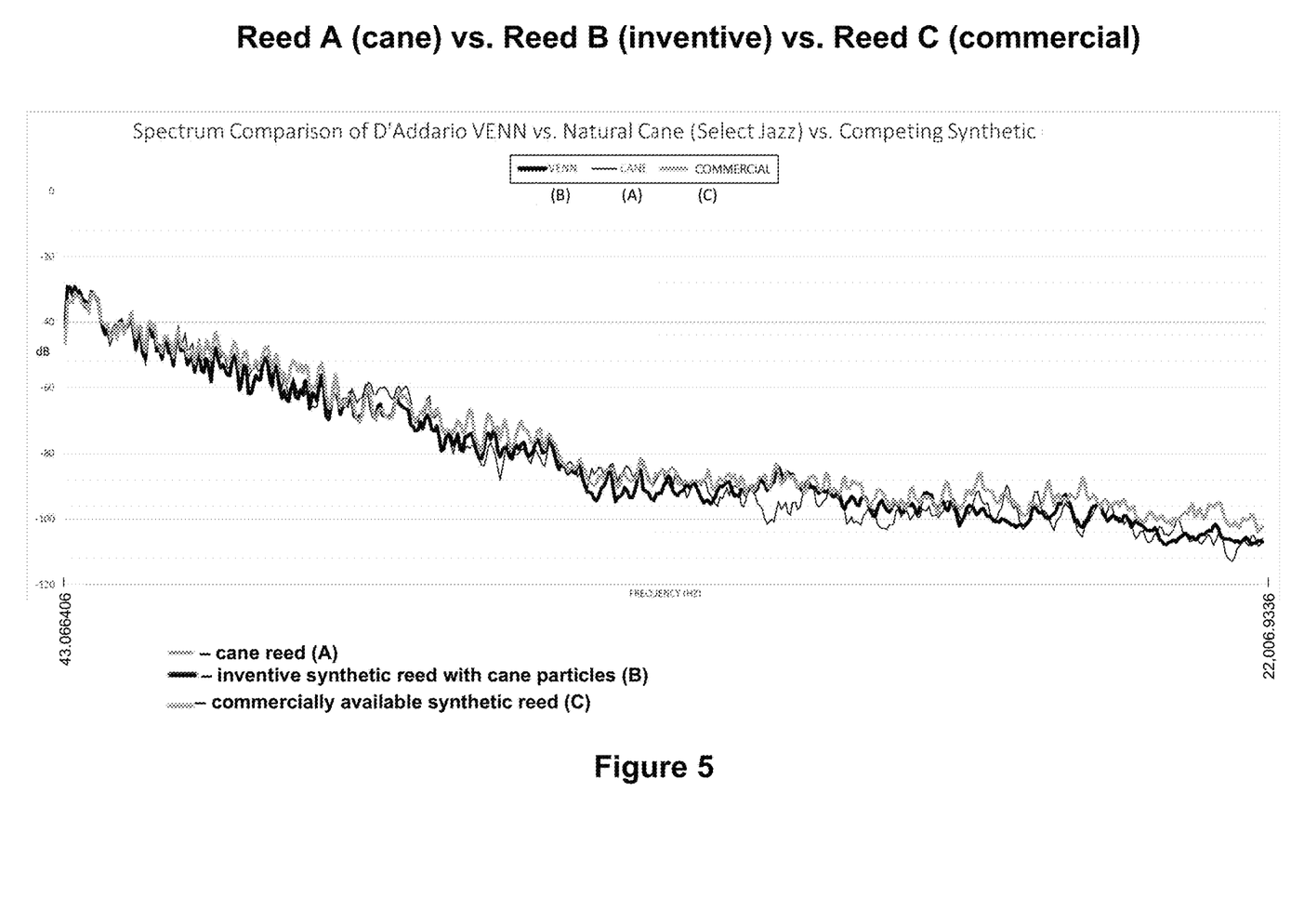
FIGS. 5-7 are graphs of spectral analyses comparing acoustic properties (dB vs. frequency) of a natural cane reed, the disclosed synthetic reed with dispersed cane particles and a commercially available synthetic reed without cane particles.
Figure 6:
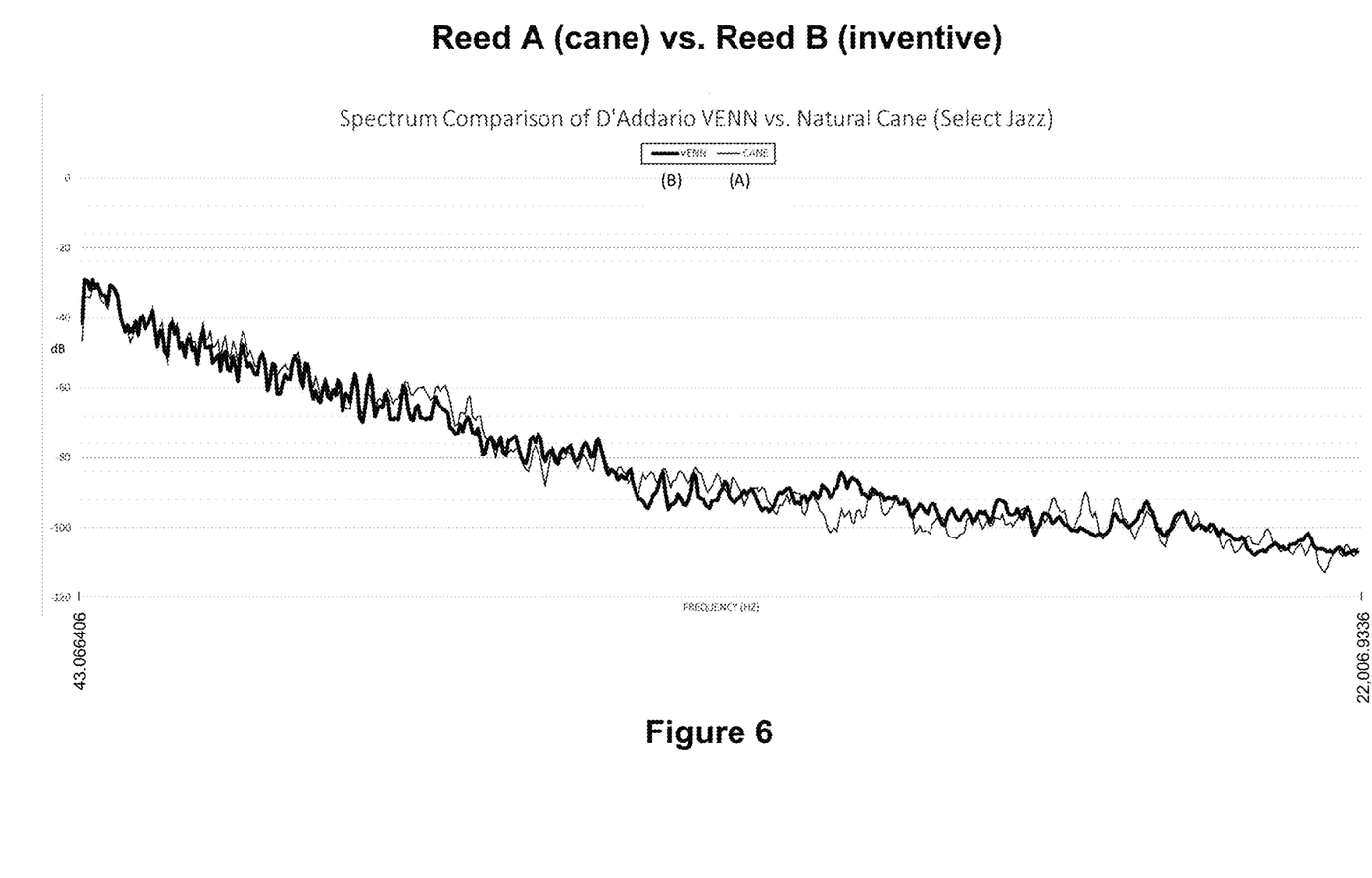
Figure 7:
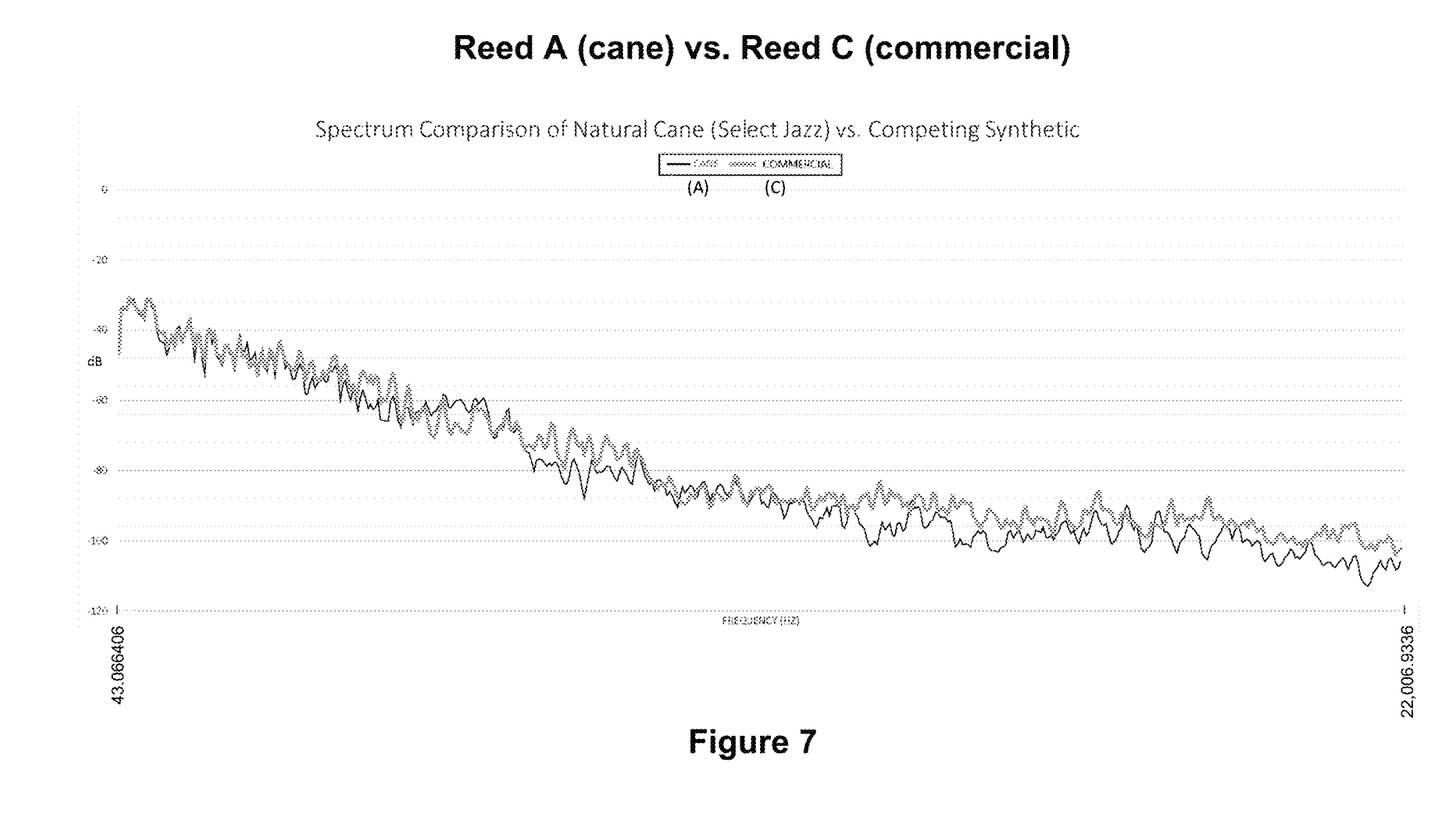

Spectral analyses of the respective reeds are shown in the graphs of FIGS. 5-7, plotting decibels (dB) against frequency (Hz). FIG. 5 includes overlayed graphical data for Reed A, Reed B and Reed C. FIG. 6 includes the overlayed graphs of Reed A vs. Reed B, without Reed C. FIG. 7 includes overlayed graphs of Reed A sound data vs. Reed C sound data, without Reed B. The raw numeric data for each reed was extracted from the spectral analyses of FIGS. 5-7 and compared using 512 different dB reference points. For Reed B, the average difference in dB reading from Reed A over the data points over the duration of the audio sample was 0.099731 dB. For Reed C, the average divergence from Reed A over the same 512 data points over the duration of the audio sample was −3.355865 dB. Thus, Example 1 indicates that the inventive synthetic reed with cane particles sounds 33.7 times closer to a natural cane reed than does a leading commercially available synthetic reed as measured in dB.

Example 2

Figure 8A:
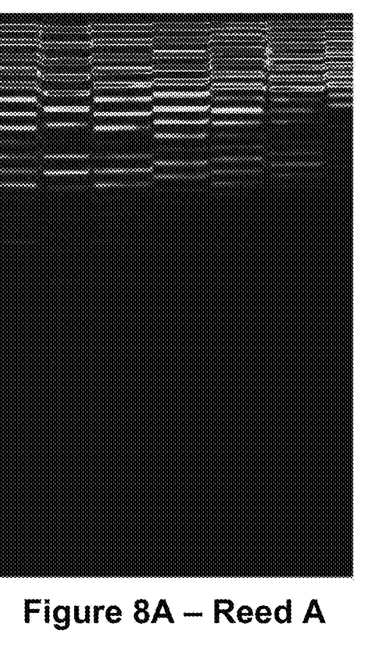
FIGS. 8A-8C show additional comparative spectral data for a natural cane reed, the disclosed synthetic reed with dispersed cane particles and a commercially available synthetic reed without cane particles.
Figure 8B:
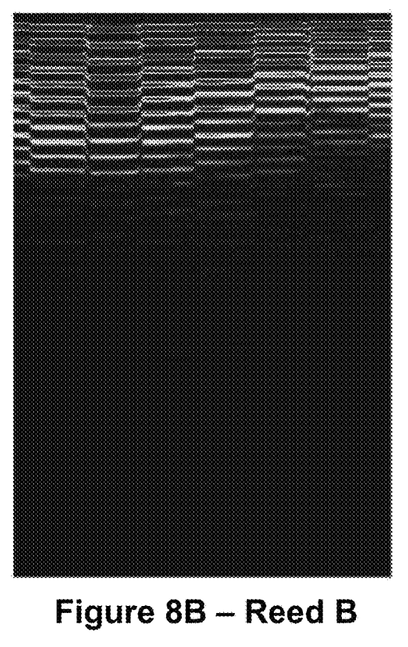
Figure 8C:
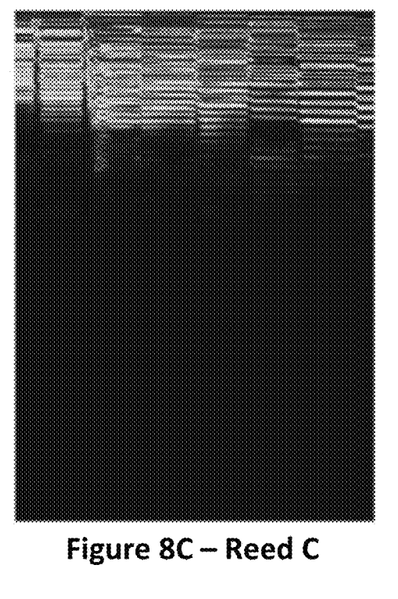

Additional analyses of the audio tracks were performed using a tool provided by Blue2Digital.com. The Blue2Digital.com tool utilizes an algorithm to estimate the frequency of an audio signal to compose the magnitude of the function that calculates a windowed discrete-time Fourier transform for the given audio input. The algorithm includes computing cross-correlation in the spatial and frequency domain, rather than comparing audio files directly. FIG. 8A shows a graphical spectrum output for the natural cane Reed A, FIG. 8B shows a spectrum output for the disclosed synthetic Reed B and FIG. 8C shows the spectrum output for the commercial synthetic as provided by the Blue2Digital.com tool. As can be seen in FIGS. 8A-8C, the graphical depiction of the spectrum of Reed B looks substantially more similar to that of Reed A than does the graphical depiction of the spectrum of Reed C. As analyzed by the proprietary Blue2Digital.com system, the analysis yielded 44.25% "acoustic similarity" between Reed B and Reed A, and 25.92% acoustic similarity between Reed C and Reed A.

As shown in Examples 1 and 2, the inventive synthetic reed with cane particles much more closely mimics the sound of a natural cane reed than the commercial synthetic reed. Altogether, the disclosed synthetic reeds comprising a polymeric matrix and randomly distributed cane particles have shown significant improvement in sound quality relative to known synthetic reeds, but without the cane particle additive. As compared to known synthetic reeds, musicians report a more natural and pleasing sound profile and feel (collectively referred to as playability) that more closely matches natural cane reeds when playing with the disclosed synthetic reed with cane particles. It is understood that the natural damping properties of the cane are imparted into the synthetic matrix—even when included at relatively low concentrations—giving it a much more natural feel and sound when played in a woodwind instrument. The synthetic reeds with cane particles have additionally shown improved strength and durability as compared to cane reeds.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A synthetic reed for a woodwind instrument, comprising:
   a synthetic resin matrix substrate; and
   cane particles randomly distributed and suspended within the synthetic matrix substrate.

2. The synthetic reed of claim 1, further comprising synthetic fibers.

3. The synthetic reed of claim 2, wherein a plurality of the synthetic fibers are continuous within the matrix substrate.

4. The synthetic reed of claim 3, wherein the synthetic fibers comprise compiled yarn being formed of at least two different fibers or filaments.

5. The synthetic reed of claim 2, wherein the synthetic fibers include a plurality of individual synthetic fibers that extend throughout the matrix substrate in multiple different directions.

6. The synthetic reed of claim 2, wherein the synthetic fibers are selected from a group consisting of polypropylene, polyester, nylon, zylon, para- or meta-aramid, glass, polyphenylene sulfide (PPS), polyether ether ketone (PEEK), polyethylene terephthalate (PET), polyethylene naphthalate (PEN), and liquid crystal polymer (LCP), and combinations thereof.

7. The synthetic reed of claim 1, wherein the resin matrix substrate is a thermoset material formed from a Part A component comprising an epoxy resin and a Part B component comprising a hardener with dispersed cane particles.

8. The synthetic reed of claim 7, further comprising synthetic fibers, wherein the Part B component further comprises one or more additives for enhancing adhesion of the resin matrix to the synthetic fibers.

9. The synthetic reed of claim 1, wherein the cane particles are present within the resin matrix at a concentration within a range of approximately 0.5% to 10% by volume.

10. The synthetic reed of claim 9, wherein the cane particles are present within the resin matrix at a concentration within a range of approximately 1% to approximately 3% by volume.

11. The synthetic reed of claim 9, comprising approximately 25-75 mg cane particles.

12. The synthetic reed of claim 1, wherein at least a majority of the cane particles in the resin matrix has a size of less than 100 micrometers.

13. The synthetic reed of claim 12, wherein at least some cane particles in the resin matrix have a size of 10 micrometers or less.

14. The synthetic reed of claim 2, wherein the synthetic reed is formed by a process that includes a step of pultrusion to impregnate the synthetic fibers and initiate curing of the matrix substrate to form a reed blank precursor of the reed.

15. The synthetic reed of claim 1, wherein the synthetic reed yields an average difference in decibel reading compared to a natural cane reed within an approximate range of 0.001 dB-1.0 dB when playing under common conditions.

16. A synthetic reed for a woodwind instrument, comprising:
   a synthetic resin matrix substrate;
   synthetic fibers comprising at least two different filaments; and
   cane particles suspended within the synthetic matrix substrate, wherein
   the cane particles are randomly distributed within the resin matrix substrate at a concentration within a range of approximately 0.5% to 10% by volume.

17. A method for producing a synthetic woodwind instrument reed or a precursor thereof, comprising:
   providing synthetic fibers;
   providing a Part A component comprising an epoxy resin and a Part B component comprising a hardener with dispersed cane particles;
   combining the Part A component with the Part B component to form a non-solid matrix;
   combining the synthetic fibers and the non-solid matrix;
   initiating hardening of the non-solid matrix to provide a solid form with synthetic fibers and cane particles; and
   forming the solid form into a shape of a woodwind instrument reed.

18. The method of claim 17, wherein a concentration of cane particles in the non-solid matrix is within an approximate range of 0.5% to 10% by volume.

19. The method of claim 17, wherein the non-solid matrix is hardened via a step of pultrusion or extrusion.

20. The method of claim 17, wherein the cane particles take a powder-like form prior to being included with the Part B component.

* * * * *